June 21, 1949. C. F. FRAGOLA ET AL 2,473,516
GYRO FLUX VALVE COMPASS SYSTEM
Filed May 29, 1943 2 Sheets-Sheet 1

INVENTORS:
C. F. FRAGOLA
R. V. CRADDOCK
BY Herbert H. Thompson
their ATTORNEY.

June 21, 1949.   C. F. FRAGOLA ET AL   2,473,516
GYRO FLUX VALVE COMPASS SYSTEM

Filed May 29, 1943   2 Sheets-Sheet 2

INVENTORS:
C. F. FRAGOLA
R. V. CRADDOCK
BY Herbert H. Thompson
ATTORNEY.

Patented June 21, 1949

2,473,516

UNITED STATES PATENT OFFICE 2,473,516

GYRO FLUX VALVE COMPASS SYSTEM

Caesar F. Fragola, Brooklyn, and Reginald V. Craddock, Williston Park, N. Y., assignors to The Sperry Corporation, a corporation of Delaware Application May 29, 1943, Serial No. 488,996

4 Claims. (Cl. 33—222)

Our invention particularly relates to a system for controlling the precession of a gyro.

Gyroscopes are employed to provide a reference or indication for navigational and other purposes. With directional gyros, a directional indication in azimuth is afforded and gyro verticals provide a vertical reference. However, these gyros do not continuously maintain a true reference indication but wander or depart therefrom. Therefore, means are provided such as earth inductor compasses or flux valves for use with directional gyros to provide an azimuthal reference. In the case of gyro verticals pendulously mounted means are employed to function as a vertical directional reference. In each case, the references so provided are used to correct the position of the gyro when it departs from a position providing a true indication.

The reference means so employed in controlling or effecting precession of the gyro to correct positions of indication ordinarily comprise signal voltage generators which provide a voltage output when the position of the gyro and the true reference position are in disagreement, and the amplitude of the signal voltage is proportional to the magnitude of displacement or the error angle existing between the gyro and its reference. Under these conditions, the torque applied by the gyro-precessing means under the control of the signal generator is proportional to the error angle and therefore comparatively very small for small error angles.

It is the primary object of our invention to provide a control system for a motor or servo means comprising a signal pick-off or signal voltage generator and control means for said motor means responsive to a comparatively small signal voltage for effecting full operation of said motor or servo means.

It is a further object to provide a control for a motor or servo means wherein any multiple frequency of the signal frequency or a sub-multiple thereof may be used to control the motor means.

It is another object of our invention to provide a system for controlling precession of a gyro which is so arranged that substantially full torque is applied to effect precession of the gyro when a comparatively small angle of error exists.

Another object of our invention resides in providing a control system comprising a signal voltage generator and an electrical circuit including an oscillator, the output of said circuit being employed to control the gyro-precessing means and being operable when a relatively small signal voltage is supplied thereto to provide an output of relatively large and constant magnitude.

Another object resides in the provision of a control system including an electrical circuit and oscillator of the above character and also phase sensitive amplifier means.

Further objects reside in providing a control system of the above character in which a flux valve is employed as a signal generator; a system in which the flux valve is pendulously mounted and positionable remote from the gyro; and a system in which the flux valve is stabilized by the gyro.

With the foregoing and other objects in view, our invention includes the novel elements and the combinations and arrangements thereof described below and illustrated in the accompanying drawings, in which.

It will be understood that the control system of our invention may be employed in connection with a vertical reference to control the erection of a gyro vertical which provides a vertical reference indication, and, likewise, may be employed in connection with a directional reference to control the position of a directional gyro in azimuth. Therefore, in the following, we have described the application of our invention to a directional gyro mainly for exemplary purposes.

Figure 1:
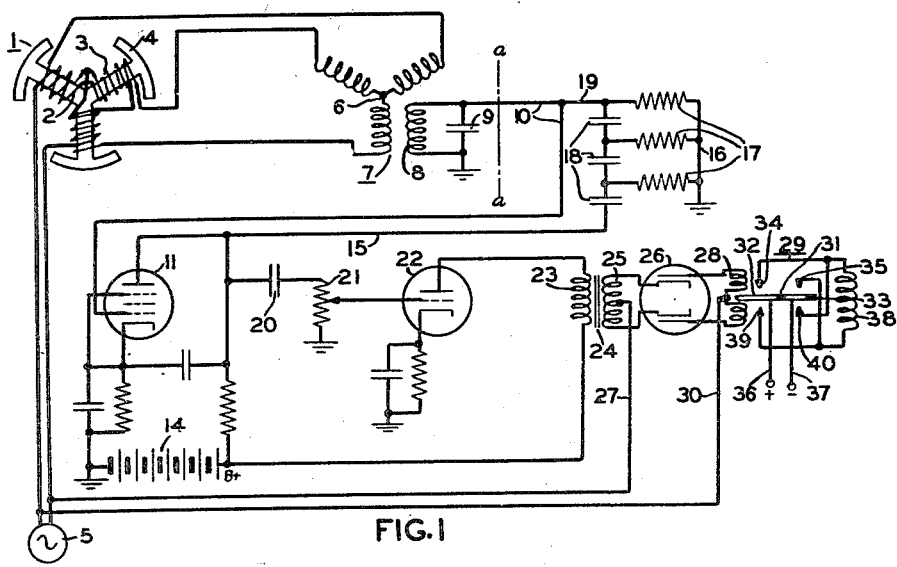
Fig. 1 is a wiring diagram of an electrical circuit embodying a preferred form of our invention.
Figure 2:
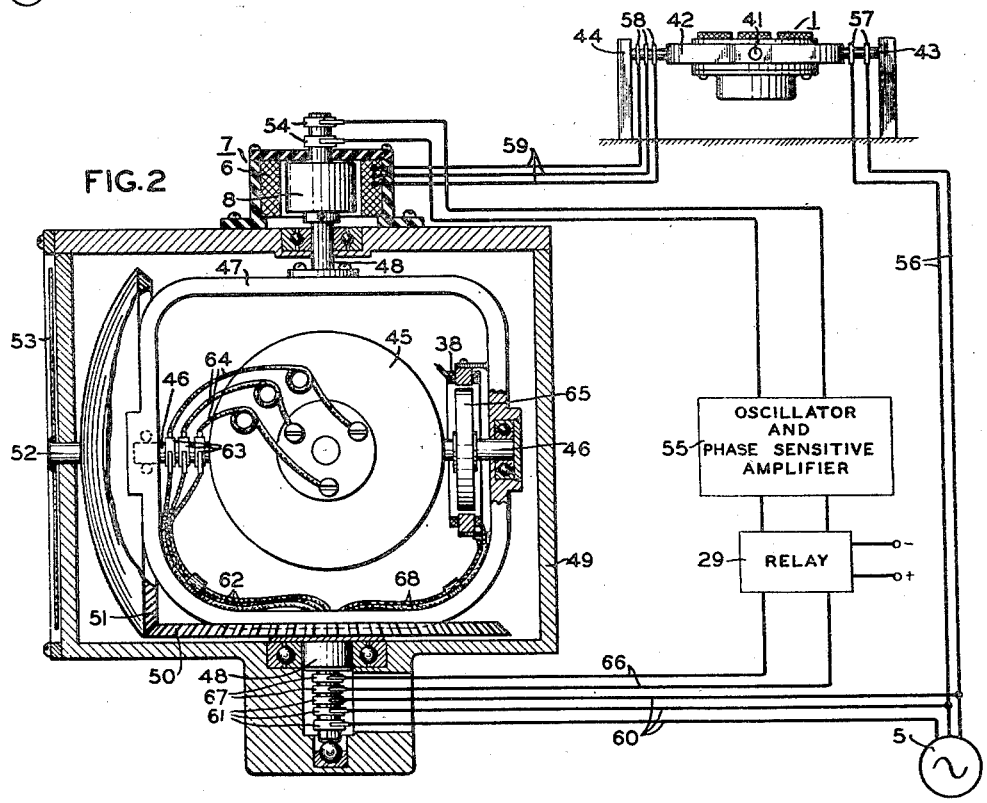
Fig. 2 illustrates our invention applied to a directional gyro.

Referring first to Figs. 1 and 2, we have disclosed a flux valve indicated generally at 1 as a signal generating means or means sensitive to any external D. C. field. In the embodiments of our invention herein disclosed the flux valve is sensitive to the earth's magnetic field or any unidirectional field which is controlled in direction by the earth's field to provide a directional reference in azimuth for controlling precession of the gyro in azimuth and therefore correction thereof for any deviation or wandering which may occur.

The flux valve, in the embodiment of Fig. 1, is of the multi-legged type and comprises three radially extending cores, preferably disposed at equal angles to each other. These cores are preferably of highly permeable magnetic material and carry thereon exciting coils indicated generally at 2 and pick-up coils indicated generally at 3. The exciting coils are energized from a suitable source of periodically varying or alternating current. The output coils, respectively, will generate a signal voltage which, in amplitude and phase, is dependent upon the relative position of the core associated therewith and the direction of an external magnetic field, such as the earth's field. In practice, the outer ends of the core legs may be provided with collector rings 4, as shown.

In the embodiment shown in Fig. 1, the flux valve is energized from a source of alternating current 5, and the pick-up coils 3 thereof are connected at one end together and the other ends in polycircuit fashion to the polycircuit stator 6 of a signal transformer 7 which may be structurally a unit of the Selsyn or Autosyn type. Therefore, assuming that the flux valve 1 is fixed in position on a craft and turns in azimuth therewith, the stator of the transformer 7 will provide a resultant alternating electromagnetic field which remains fixed in space, assuming, of course, that the stator 6 rotates in azimuth with the flux valve 1. The rotor 8 of the transformer 7, as hereinafter explained, is movable with rotation of the vertical ring of the gyro in azimuth, being preferably mounted on an extension of the trunnion of the vertical ring and being rotatable relative to the stator 6. Under these conditions, if the vertical ring of the gyro and the rotor 8 of the transformer 7 remain stationary in space while the flux valve and the stator of the transformer turn in azimuth, no voltage will appear across the rotor 8, assuming that in the assumed position thereof it lies at right angles to the resultant field of the transformer stator.

In this case, the transformer 7 may be considered broadly as a signal generator, since its stator functions to produce a directional reference through the interaction between the flux valve and the earth's magnetic field while the rotor will provide a signal voltage output changing in magnitude with rotation thereof relative to the directional reference provided by the stator and of a phase sense dependent upon its orientation in the field of the stator.

A tuning condenser 9 is connected across the rotor 8 and one end thereof may be grounded as shown, the other end being connected through conductor 10 to the grid of an oscillator tube 11 of an electronic oscillator or signal amplifier. Tube 11 may, for example, be a 6SJ7 or a 6L6 type of tube, although simple triode tubes and other types of tubes may be employed. The tube 11 is preferably so arranged that an extremely small signal voltage, which may be supplied thereto from the rotor 8 of the signal transformer, will be sufficient to cause the tube to oscillate. In other words, it may be said that the oscillator is biased substantially to but slightly below the point at which it will oscillate, and whether or not an independent bias is supplied to the tube for this purpose will depend upon the type of tube employed.

The plate circuit of the tube 11 is connected through conductor 15 to a tuned oscillator or phase shifting circuit 16. This circuit comprises the resistors 17 and condensers 18 and, in accordance with our invention, is preferably designed so that the oscillator will oscillate at a frequency substantially one-half that of the signal voltage derived from the rotor 8 of the signal transformer 7. Furthermore, the oscillator circuit 16 is arranged to supply energy for feedback purposes which is in phase with the output derived from the tube 11. This energy, being of a frequency equal to one-half that of the signal voltage derived from transformer 7, is fed back from circuit 16 through conductor 19 and conductor 10 to the grid of tube 11 to sustain the oscillations at this frequency. However, although the output of the oscillator is of a frequency one-half that of the signal used in controlling or tripping the oscillator, it has a phase sense which reverses with reversal in phase of the control signal. In other words, it will have a phase relation to that of reference source 5, used in exciting the flux valve, which is dependent upon the signal voltage output of the transformer secondary 8, that is, in phase with the reference voltage if the signal voltage has one phase sense and of opposite phase with respect to the reference voltage if the signal voltage is of the opposite phase sense. In practice, the output of a flux valve is not sinusoidal and the rather peaked wave forms are not the same height. For example, on the positive half-cycle of the energizing current, a positive peak of the double frequency wave will be high while the second positive peak on the negative side of the energizing current will be much smaller. The oscillator will lock in with the dominating voltage wave and hence, will tend to lock in at the beginning of the positive half-cycle of energizing current rather than the second positive cycle of signal voltage. Likewise, the oscillator will tend to lock in on the dominating negative half-cycle of signal voltage rather than the smaller one and hence discrimination will be achieved. With this arrangement, when a relatively small signal voltage representing a small error is supplied to the grid of tube 11 and is of sufficient magnitude as to trip the oscillator, the tube will immediately commence to oscillate and through the medium of the phase shifting circuit 16, which functions to sustain the operation or oscillation of the tube at the tuned frequency of the phase shifting circuit, will supply an output which will be of substantially full magnitude or constant maximum amplitude and of a frequency equal substantially to one-half the frequency of the signal voltage derived from the transformer 7 or equal to the frequency of the alternating current derived from source 5.

The output from oscillator 11 is coupled through condenser 20 and resistor 21, which may be employed to regulate the magnitude of the signal supplied, to driver or electron tube 22. The plate of tube 22 is connected to the primary 23 of a coupling transformer 24, the secondary 25 of which is connected with the cathodes of a duo-diode tube 26. Opposite ends of the transformer secondary 25 are connected to respective cathode elements of the tube 26 and a center tap thereof is connected through conductor 27 to one side of the source of current 5. The plate elements of the tube 26 are connected across the field coil 28 of a relay indicated generally at 29, and the center tap thereof is connected through conductor 30 to the other side of the source of alternating current 5.

The last-described portion of our circuit functions as a phase sensitive amplifier. In other words, the direction of the field produced by the coil 28 of the relay will depend upon the phase relationship of the signal, supplied from the oscillator through the driver and to the transformer 24, with respect to the phase of the source 5. Furthermore, the phase relationship of the output of the oscillator with respect to the source of alternating current 5 will be dependent upon the orientation of the rotor 8 of the transformer with respect to the resultant field of the polycircuit stator 6. Therefore, depending upon the direction in which the rotor 8 or the vertical ring of the gyro turns from a position of zero voltage output of the rotor with respect to the reference provided by the flux valve and the stator of the transformer, the armature 31 of the relay will be moved in one direction or the other.

Assuming that the armature is moved upwardly as viewed in Fig. 1, the two conducting segments thereof, 32 and 33, which are electrically insulated from each other, will engage the contacts 34 and 35. Since the armature segments 32 and 33 are connected to a source of suitable electrical energy through conductors 36 and 37, the precessing coil 38 will be connected across said energy source. On the other hand, if the armature is actuated in the opposite direction, it will engage the contacts 39 and 40 and likewise connect the precessing coil across said source of electrical energy but in opposite polarity relationship. Any suitable D. C. amplifier may be substituted for the relay circuit and employed to control the operation of the precessing coil or a torque motor. Due to the phase sensitive operation of our circuit, the precessing coil 38 or torque motor will be controlled to exert a torque in the proper direction to cause the vertical ring of the gyro to precess back to the position from which it has deviated or wandered.

In Fig. 2, we have shown the preferred correlation of the electrical elements of our control system with a directional gyro. The flux valve 1 is remote from the gyro and preferably pendulously supported as shown. The casing of the flux valve is rotatably supported on trunnions 41 in a gimbal ring 42 which in turn is supported on trunnions 43 in suitable supports 44. The flux valve is preferably supported in this manner so that it will be subjected substantially only to the horizontal component of the earth's magnetic field, and is preferably remotely positioned from the gyro because in aircraft and like installations the gyro is ordinarily surrounded by magnetic materials and members and lies in fairly close proximity to other instruments and electrical devices which would affect the signal output of the flux valve and give the resultant gyro-indication a deviation error. In such cases, the flux valve is preferably pendulously supported and positioned in some remote location, such as near the wing tips of the aircraft, in order to shield or space it as much as possible from magnetic and other undesirable effects.

The gyroscope in the embodiment shown in Fig. 2 comprises the usual rotor bearing case 45, within which the rotor is adapted to spin. The case 45 is rotatably supported on trunnions 46 which are journalled in the vertical ring 47, and the ring 47 in turn is rotatably supported by trunnions 48 which are journalled in the outer casing 49, trunnions 46 and 48 providing mutually perpendicular axes of support for the rotor bearing case.

Directional indications are derived from the vertical ring through the gears 50 and 51, gear 51 being mounted on shaft 52 on which is also mounted the indicator or needle 53. In the embodiment shown, the signal transformer 7 is mounted on the outer casing 49, while the rotor 8 thereof is mounted on and secured to rotate with the trunnion 48 of the vertical ring 47. Hence, the rotor of the transformer moves in azimuth with the vertical ring 47 of the gyro and the stator 6 thereof moves in azimuth with the flux valve 1. Any signal output from the rotor of the transformer is obtained through slip rings 54 and supplied to the oscillator and phase sensitive amplifier circuit above described and indicated generally at 55 in Fig. 2.

The flux valve 1 is energized from a source of alternating current 5 through conductors 56 and suitable slip rings 57 on trunnion 43. It will be understood that similar slip rings are provided on the trunnion 41. Likewise, the output of flux valve 1 passes through suitable slip rings on the trunnion 41 and slip rings 58 on trunnion 43 and thence through conductors 59 to the stator 6 of the signal transformer. Energy for driving the motor of the gyro, assuming that the rotor is electrically spun, is derived through conductors 60, slip rings 61, conductors 62 and slip rings 63 mounted on the trunnion 46 of the rotor bearing case. The latter slip rings are, of course, electrically connected with conductors 64 which are connected with the motor of the gyro and, it will be understood, the conductors 62 are connected in relatively insulated relation with the respective insulated slip rings 61 and 63.

The torque exerting means or torque motor in the embodiment of our invention herein illustrated comprises a stator including the coil 38, hereinabove referred to, which is mounted on the vertical ring 47, concentric to the trunnion 46 of the rotor bearing case, and is designed to exert a torque on a rotor 65, which is secured to the trunnion 46, in one direction or the other depending upon the direction of operation of the relay 29. Torques exerted by the torque motor will cause the vertical ring to precess about the axis of the trunnions 48, the direction of precession being, of course, dependent upon the direction in which the torque is applied. Energy, of course, is supplied to the coil 38 of the torque motor from the source of energy, hereinabove referred to, through the relay 29, conductors 66, slip rings 67 and conductors 68, as shown in Fig. 2.

It is believed that the operation of the foregoing described embodiment of our invention will be apparent from the above description and in brief is as follows. Assuming that the craft on which the system is mounted turns in azimuth and that the gyro or the vertical ring thereof remains stationary in space, the flux valve 1 and the stator of the transformer 7 will rotate in azimuth with the craft, but the rotor 8 of the transformer will remain fixed in space with the vertical ring of the gyro. Under these conditions, the direction of the resultant field produced by the stator of the transformer will remain normal to the axis of the winding of the rotor 8 and no signal voltage will be generated in the rotor. However, if the gyro should wander, the rotor of the transformer will rotate relative to the resultant field of the stator and a signal voltage will be induced in the rotor. Since the oscillator is so arranged that only a comparatively small signal voltage need be supplied thereto in order to trip it or cause it to oscillate, a small angular deviation from a perpendicular relationship between the axis of the winding of the rotor of the transformer and the direction of the resultant field of the transformer stator will cause the oscillator to operate. When this occurs, the output of the oscillator will rise substantially immediately to full, maximum value, thereby causing the torque motor to apply maximum torque about the trunnion of the rotor bearing case. Hence, for a small angular deviation or wandering of the gyro in azimuth to a relatively small degree, the gyro will be caused to precess under the application of maximum torque thereto and, of course, in the proper direction to eliminate the error.

It will be observed that with a control system of the character above described it is unnecessary to provide any frequency doubling device in order to provide a phase sensitive control system. Furthermore, it will be observed that while we have illustrated a relay as the control means for the torque motor which is controlled by the oscillator circuit, it will be understood that the output of our control circuit may be supplied directly to one phase of a two-phase torque motor, the other phase of which is constantly excited from a source of alternating current such as the source 5.

Figure 3:
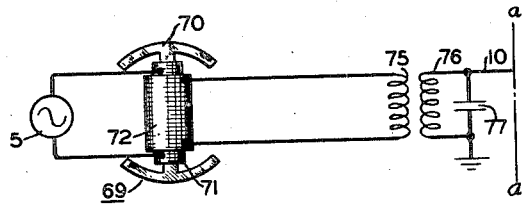
Fig. 3 is a partial wiring diagram of a modification.
Figure 4:
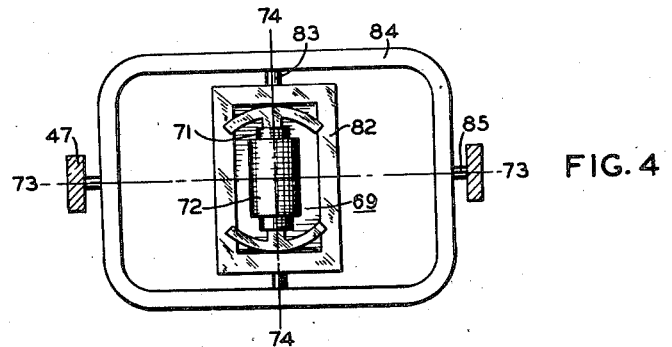
Fig. 4 is a section taken in about the plane 4—4 of Fig. 5, diagrammatically illustrating the relative angular relationship of the gyro and the flux valve elements embodied in the modification.
Figure 5:
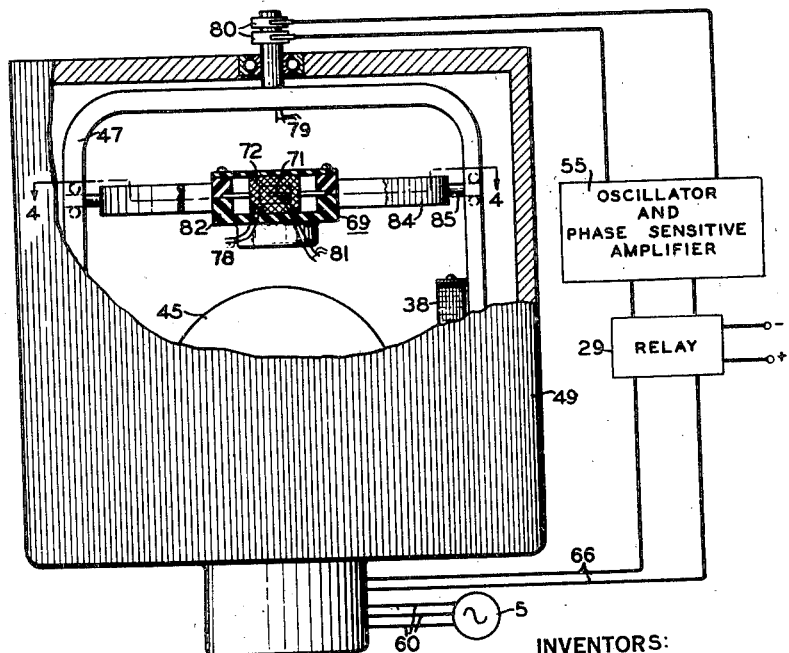
Fig. 5 is a fragmentary elevation view of the gyro and schematically of our modified control system.

In the modification of our invention shown in Figs. 3 through 5, a flux valve comprising a single leg is employed and mounted to rotate in azimuth with the gyro. Furthermore, since we employ a flux valve of this character and one which is mounted for rotation in azimuth with the gyro, we may eliminate the signal transformer. As shown in Fig. 3, the flux valve 69 in this embodiment comprises a single, generally linear leg 70 of permeable material on which are mounted exciting coils 71 and a pick-up coil 72. In a flux valve of this character, maximum signal voltage will be generated in the pick-up coil 72 when the longitudinal axis of the leg 70 lies substantially parallel with the direction of the earth's magnetic field or when it lies in a north-south plane. On the other hand, when it lies in an east-west plane no signal voltage will be generated in the coil 72.

Therefore, we propose to mount a flux valve of this character for rotation with the vertical ring of the gyro in azimuth and preferably pendulously support it on the vertical ring 47, as shown in Fig. 5. Under these conditions, the vertical ring 47 of the gyro and the flux valve 69 may be relatively angularly arranged in the manner shown in Fig. 4 wherein their axes lie at right angles to each other. In other words, assuming that the axis 73—73 of the vertical ring lies in a north-south plane, the longitudinal axis 74—74 of the flux valve will lie in an east-west plane. As long as the vertical ring provides a true north-south indication, no signal voltage output will be derived from the flux valve 69 because its axis will lie in an east-west plane. However, should the vertical ring of the gyro deviate from this position, the axis of the flux valve will likewise deviate from an east-west position and a signal voltage will appear across the output of the coil 72 thereof. The phase of this signal voltage will depend on the direction of azimuthal movement of the flux valve from an east-west position relative to the earth's magnetic field.

In the embodiment shown, the casing 82 of flux valve 69 is supported on trunnions 83 journalled in gimbal ring 84 which, in turn, is supported on trunnions 85 journalled in the vertical ring 47 of the gyro. In this manner, the flux valve is pendulously supported on mutually perpendicular axes in spaced relation to the rotor bearing case of the gyro so that the flux valve may be maintained substantially in a horizontal plane at all times while it will move in azimuth with the vertical ring.

The output of coil 72 of the flux valve is coupled through coil 75 to coil 76 across which a tuning condenser 77 is preferably connected. One side of coil 76 and condenser 77 is grounded, as shown, and the other side is connected through conductor 10 to the grid of oscillator tube 11 in the same manner as hereinabove described in connection with Fig. 1. It will be understood that the balance of the circuit of Fig. 3 will be substantially identical with that portion thereof illustrated in Fig. 1 to which the output from the rotor of the transformer 7 is supplied. In other words, the dot-dash line a—a in Figs. 1 and 3 represents the point of connection between the respective signal voltage input circuits to the oscillator circuit and the common oscillator and associated phase sensitive amplifier circuit.

In the arrangement shown in Fig. 5, the output from flux valve 69 is taken through leads 78 and through suitable slip rings on the trunnions 83 and 85 and connections (not shown) and through conductors 79 and slip rings 80 to the oscillator and phase sensitive amplifier 55. The exciting coils of the flux valve may be connected through leads 81 and suitable slip rings on trunnions 83 and 85 (not shown) with two of the conductors, such as the conductors 64 of Fig. 2, which supply electrical energy to the motor for the rotor of the gyro. Otherwise, the general arrangement and association of parts shown in Fig. 2 may be followed in forming the embodiment of our invention shown in Fig. 5. It will be observed, however, that the output from the flux valve 69 is supplied directly to the oscillator circuit.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for controlling precession of a gyro, a gyro including a rotatably supported rotor bearing case, an electronic amplifier, a source of periodically varying reference current, phase-sensitive means controlled by the voltage output of said electronic amplifier for causing precession of said gyro in one direction or the other in accordance with the phase relationship of the signal supplied thereto relative to said current source, means including a flux valve for supplying a signal voltage when the position of said rotor bearing case departs from a predetermined azimuthal position relative to the horizontal directional component of the earth's field, said phase-sensitive means and said flux valve being energized from said current source and said flux valve being adapted to provide a signal voltage output having a frequency substantially twice the periodicity of said source, said amplifier comprising an oscillator including a circuit tuned to the frequency of said current source and a feedback path from said tuned circuit to sustain oscillations at its tuned frequency, the signal voltage from said signal voltage supplying means being supplied in controlling relation to trip said oscillator and to control the phase sense of its output relative to said current source.

2. In a gyro flux valve compass system, a source of periodically varying current, a flux valve energized from said source, a directional gyro, the flux valve being movable in azimuth relative to said gyro, a two part signal transformer connected to receive the flux valve signal voltage output, one part being connected to move with azimuthal movements of the gyro and the other part being connected to move in azimuth with said flux valve, an oscillator connected to be triggered on and off by the output of said signal transformer and tuned to oscillate at the frequency of said current source, and phase-sensitive means energized by the output of said oscillator and said current source and including torque-exerting means for precessing said gyro in azimuth in accordance with the phase sense of the signal transformer output.

3. A system of the character recited in claim 2 in which the oscillator embodies a feedback circuit for sustaining oscillations at its tuned frequency.

4. In a gyro flux valve compass system, a source of periodically varying current, a flux valve energized from said source, a directional gyro, the flux valve being movable in azimuth relative to said gyro, a two part signal transformer connected to receive the flux valve signal voltage output, one part being connected to move with azimuthal movements of the gyro and the other part being connected to move in azimuth with said flux valve, an oscillator connected to be triggered on and off by the output of said signal transformer and tuned to oscillate at the frequency of said current source, torque-exerting means for precessing said gyro in azimuth, and means including a relay connected to control the supply of current to said torque-exerting means, said means being energized by the output of said oscillator and by said current source.

CAESAR F. FRAGOLA.
REGINALD V. CRADDOCK.

REFERENCES CITED

The following references are of record in the file of this patent:

UNITED STATES PATENTS

| Number | Name | Date |
|---|---|---|
| 1,982,702 | Sperry, Jr. | Dec. 4, 1934 |
| 1,988,521 | Sperry et al. | Jan. 22, 1935 |
| 2,047,609 | Antranikian | July 14, 1936 |
| 2,252,338 | Alkan | Aug. 12, 1941 |
| 2,357,319 | Esval et al. | Sept. 5, 1944 |
| 2,383,461 | Esval et al. | Aug. 28, 1945 |